(12) United States Patent
Kim

(10) Patent No.: US 6,297,901 B1
(45) Date of Patent: Oct. 2, 2001

(54) OPTICAL ATTENUATING ISOLATOR

(75) Inventor: Jeong-mee Kim, Yongin (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/482,532

(22) Filed: Jan. 14, 2000

(30) Foreign Application Priority Data

Jan. 14, 1999 (KR) ........................................ 99-846

(51) Int. Cl.$^7$ .................................................. G02F 1/09
(52) U.S. Cl. ................................ 359/281; 359/283
(58) Field of Search ............................ 359/281, 283, 359/280

(56) References Cited

U.S. PATENT DOCUMENTS

| | | | |
|---|---|---|---|
| 4,683,421 | * 7/1987 | Miller et al. | 324/96 |
| 5,812,304 | * 9/1998 | Shirasaki et al. | 359/324 |
| 5,889,609 | * 3/1999 | Fukushima | 359/280 |
| 5,973,821 | * 10/1999 | Onaka et al. | 359/283 |
| 6,018,411 | * 1/2000 | Fukushima et al. | 359/283 |
| 6,018,412 | * 1/2000 | Fukushima | 359/283 |
| 6,195,479 | * 2/2001 | Pan | 385/18 |

FOREIGN PATENT DOCUMENTS

| | | |
|---|---|---|
| 4-246615 | 9/1992 | (JP) . |
| 8-128806 | 5/1996 | (JP) . |
| 9-210857 | 8/1997 | (JP) . |
| 9-236784 | 9/1999 | (JP) . |

* cited by examiner

*Primary Examiner*—Georgia Epps
*Assistant Examiner*—John J. Magee
(74) *Attorney, Agent, or Firm*—Robert E. Bushnell, Esq.

(57) ABSTRACT

An optical attenuating isolator obtained by combining an optical attenuator and an isolator into a module, is provided. The optical attenuating isolator includes a first collimator, an optical attenuating filter, an isolation unit, and a second collimator. The first collimator is connected to a first optical transmission medium, and collimates light received via the first optical transmission medium. The optical attenuating filter attenuates the output light of the first collimator. The isolation unit receives light attenuated by the optical attenuating filter and passes only polarized light which is polarized in a predetermined specific polarization direction. The second collimator is connected to a second optical transmission medium, and collimates polarized light which has passed through the isolation unit, and transmits the resultant light to the second optical transmission medium. Accordingly, an optical attenuator and an isolator are configured into a module, such that insertion loss can be reduced, and that the number of optical transmission media used is reduced, thus preventing generation of loss caused by the optical transmission media. Also, an optical attenuating isolator according to the present invention is used as an optical attenuator for an optical communications system having directivity, such that deterioration of the optical communications system due to back reflection can be prevented, and that the degree of attenuation can be controlled.

20 Claims, 1 Drawing Sheet

OPTICAL ATTENUATING ISOLATOR

CLAIM OF PRIORITY

This application makes reference to, incorporates the same herein, and claims all benefits accruing under 35 U.S.C. §119 from my application OPTICAL ATTENUATING ISOLATOR filed with the Korean Industrial Property Office on Jan. 14 1999 and there duly assigned Ser. No. 846/1999.

BACKGROUND OF THE INVENTION

1. Field of the Invention

The present invention relates to an optical component which is used for optical transmission, and more particularly, to an optical component formed by combining an optical attenuator and an isolator, the optical component used as a module.

2. Description of the Related Art

In an optical network, many cases, particularly, a wavelength division multiplexing (WDM) system, use an optical attenuator to equalize optical power. However, when the optical attenuator is used, back reflection may cause a problem. Thus, an isolator is installed to the rear of the attenuator to prevent generation of this problem.

However, the use of an isolator causes several undesirable effects such as additional insertion loss, complexity of the device due to use of additional components, and an increase in the cost due to additional material.

Upon establishment of an optical network, when an optical attenuator and an isolator are connected to each other in series, insertion loss that is the sum of the insertion losses of the two optical devices, is generated. In particular, an optical add drop multiplexer requires as many optical attenuators and isolators as the number of channels, thus increasing the total size of the apparatus.

Also, when an optical attenuator is used without isolators, the back reflection of the optical attenuator is highly likely to cause problems in optical signal transmission.

SUMMARY OF THE INVENTION

It is therefore an object of the present invention to provide an improved optical attenuating isolator.

It is also an object of the invention to provide an optical attenuating isolator which can perform both attenuation and isolation functions.

A further object of the invention is to provide an optical attenuating isolator which does not suffer from back-reflection problems of the attenuator.

A yet further object is to provide an optical attenuating isolator with low insertion loss.

A still further object is to provide an optical attenuating isolator of reduced size.

Another object is to provide an optical attenuating isolator of reduced cost.

To achieve the above objects, an optical attenuating isolator according to an aspect of the present invention is provided, including: a first collimator connected to a first optical transmission medium, the first collimator for collimating light received via the first optical transmission medium; an optical attenuating filter for attenuating the output light of the first collimator; an isolation unit for receiving light attenuated by the optical attenuating filter and passing only polarized light which is polarized in a predetermined specific polarization direction; and a second collimator connected to a second optical transmission medium, the second collimator for collimating polarized light which has passed through the isolation unit, and transmitting the resultant light to the second optical transmission medium.

To achieve the above objects, an optical attenuating isolator according to another aspect of the present invention is provided, including: a first collimator connected to a first optical transmission medium, the first collimator for collimating light received via the first optical transmission medium; an isolation unit for receiving the output light of the first collimator and passing only polarized light which is polarized in a predetermined specific polarization direction; an optical attenuating filter for attenuating polarized light which has passed through the isolation unit; and a second collimator connected to a second optical transmission medium, the second collimator for collimating polarized light which has passed through the optical attenuating filter, and transmitting the resultant light to the second optical transmission medium.

To achieve the above objects, an optical attenuating isolator according to still another aspect of the present invention is provided, including: a polarizer for passing only light which is polarized in a direction that is the same as the direction of polarization of the polarizer, among the received light; an optical attenuating filter for attenuating polarized light which has passed through the polarizer; a Faraday rotator for rotating attenuated light which has passed through the optical attenuating filter by a predetermined number of degrees; and an analyzer for passing only light which is polarized in a direction that is the same as the direction of the analyzer, from among the rotated light.

To achieve the above objects, an optical attenuating isolator according to yet another aspect of the present invention is provided, including: a polarizer for passing only light which is polarized in a direction that is the same as the direction of polarization of the polarizer, among the received light; a Faraday rotator for rotating polarized light which has passed through the polarizer by a predetermined number of degrees; an optical attenuating filter for attenuating light which has passed through the Faraday rotator; and an analyzer for passing only light which is polarized in a direction that is the same as the direction of the analyzer, among the light received from the optical attenuating filter.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Isolators cause low loss with respect to light transmitted in a normal direction from an input projection terminal to an output terminal, and high loss with respect to light transmitted in the reverse direction to the normal direction, in order to prevent light from flowing backward and from recombining. Therefore, isolators are optical components for stabilizing the operation of a system.

Figure 1:
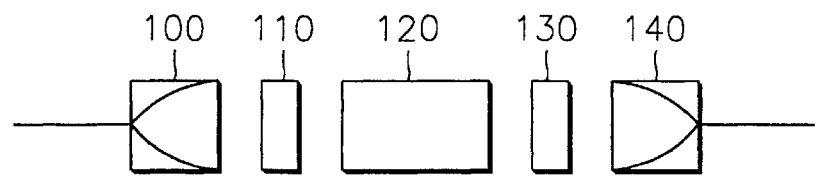
FIG. 1 is a block diagram illustrating the configuration of an isolator.

An isolator shown in FIG. 1 includes a first collimator 100, a polarizer 110, a Faraday rotator 120, an analyzer 130, and a second collimator 140. The polarizer 110 and the analyzer 130 are rotated 45° with respect to each other, and keep this relative position.

In the operation principle of isolators, isolators transmit only specific polarized light in one direction, and prevent the passage of polarized light in a direction that is perpendicular to the direction of the polarized light.

The Faraday rotator 120 rotates incident polarized light by 45°. Light reflected by the output terminal of the isolator enters the rear side of the Faraday rotator 120, and is again rotated 45°. Consequently, the reflected light is rotated 90° with respect to the incident light. Hence, the 90°-rotated reflected wave is blocked by the polarizer 110. Here, the Faraday rotator 120 uses a Faraday effect in which the polarized surface of light is rotated while the light passes through a magneto-optic material.

Figure 2:
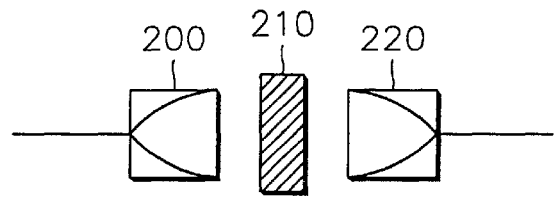
FIG. 2 is a block diagram illustrating the configuration of a variable optical attenuator.

FIG. 2 shows a variable optical attenuator. Referring to FIG. 2, the variable optical attenuator includes a first collimator 200, a linear variable neutral density filter 210, and a second collimator 220. The first collimator 200 receives light from an optical fiber, collimates the received light, and transmits the collimated light to the linear variable neutral density filter 210. The linear variable neutral density filter 210 variably attenuates the collimated light and transmits the resultant light to the second collimator 220. The second collimator 220 collimates the attenuated light to an optical fiber.

The variable optical attenuator can constantly attenuate optical signals through the above-described operation. The intensity of this attenuation is variable. The variable optical attenuator is used for measurement of the characteristics of an optical communications system.

Figure 3:
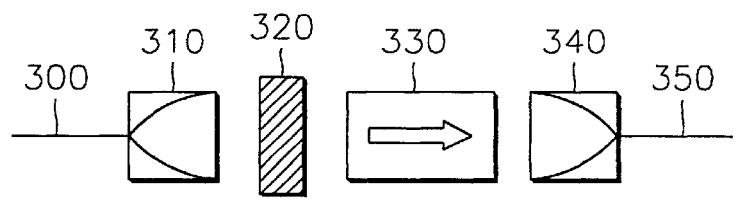
FIG. 3 is a block diagram illustrating the configuration of an optical attenuating isolator which performs both optical attenuation and isolation, according to an embodiment of the present invention.

FIG. 3 shows an optical attenuating isolator according to an embodiment of the present invention, which includes a first optical transmission medium 300, a first collimator 310, an optical attenuating filter 320, an isolation unit 330, a second collimator 340, and a second optical transmission medium 350. Light is applied to the first collimator 310 via the first optical transmission medium 300 which is an optical fiber or a waveguide.

The first collimator 310 collimates received light, and transmits the collimated light to the optical attenuating filter 320. The optical attenuating filter 320 can variably attenuate the collimated light. The degree of this attenuation can be controlled by turning a screw which is installed on the exterior of the optical attenuating isolator module according to the present invention. The attenuated light is transmitted to the isolation unit 330.

The isolation unit 330 includes a polarizer, a Faraday rotator, and an analyzer. Thus, the isolation unit 330 passes only specific polarized light in a direction which is the same as the predetermined direction of polarization to be performed by the polarizer, and prevents the passage of polarized light which is polarized perpendicular to the polarization direction of the polarizer. Light which has passed through the isolation unit 330 is collimated by the second collimator 340, and the resultant light is transmitted to the second optical transmission medium 350.

Figure 4:
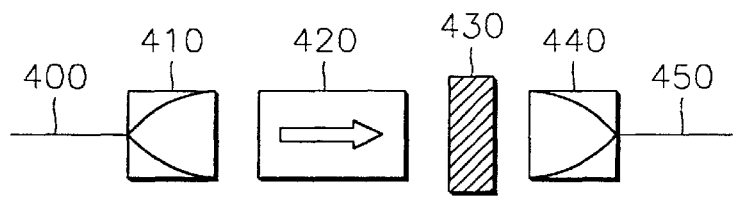
FIG. 4 is a block diagram illustrating the configuration of an optical attenuating isolator which performs both optical attenuation and isolation, according to another embodiment of the present invention.

FIG. 4 shows an optical attenuating isolator according to another embodiment of the present invention, which includes a first optical transmission medium 400, a first collimator 410, an isolation unit 420, an optical attenuating filter 430, a second collimator 440, and a second optical transmission medium 450.

The embodiment shown in FIG. 4 is the same as that shown in FIG. 3 except that the positions of the optical attenuating filters 320 and 430 are different. That is, in the embodiment shown in FIG. 4, the optical attenuating filter 430 is positioned to the rear of the isolation unit 420. On the other hand, in the embodiment shown in FIG. 3, the optical attenuating filter 320 is positioned in front of the isolation unit 330. Hence, attenuation before isolation, as shown in FIG. 3, is compared with attenuation after isolation, as shown in FIG. 4. The optical attenuating isolator of FIG. 3 or 4 can be manufactured according to the convenience of a process for manufacturing the optical attenuating isolator.

Figure 5:
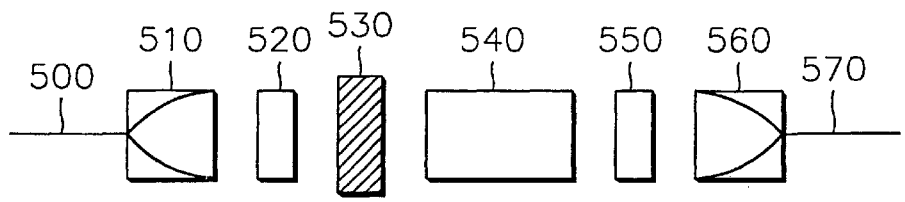
FIG. 5 is a block diagram illustrating the configuration of an optical attenuating isolator which performs both optical attenuation and isolation, according to still another embodiment of the present invention.

FIG. 5 shows an optical attenuating isolator according to still another embodiment of the present invention, which includes a first optical transmission medium 500, a first collimator 510, a polarizer 520, an optical attenuating filter 530, a Faraday rotator 540, an analyzer 550, a second collimator 560, and a second optical transmission medium 570. The embodiment shown in FIG. 5 is obtained by further installing an optical attenuating filter between the components constituting the isolation unit 330 or 420 shown in FIG. 3 or 4.

The characteristics of the embodiment shown in FIG. 5 will now be described. In the embodiment shown in FIG. 3 or 4, the isolation unit 330 or 420 performs independent isolation. On the other hand, in the embodiment shown in FIG. 5, a filter is installed between the components of the isolation unit, and performs attenuation before or after the operation of each isolator component.

In FIG. 5, light is applied to the first collimator 510 via the first optical transmission medium 500 which is an optical fiber or a waveguide. The first collimator 510 collimates received light and transmits the collimated light to the polarizer 520. The polarizer 520 selectively passes only light beams whose polarized direction is the same as the polarization direction of the polarizer, of the received light beams.

The optical attenuating filter 530 can variably attenuate the polarized light. The degree of this attenuation can be controlled by turning a screw which is installed on the exterior of the optical attenuating isolator module according to the present invention. The attenuated light is applied to the Faraday rotator 540. The Faraday rotator 540 rotates received light by 45° from the polarization direction of the light entering the Faraday rotator. The 45°-rotated light is applied to the analyzer 550. Only polarized light whose polarized direction that is the same as the polarization direction of the analyzer 550, passes through the analyzer 550. The second collimator 560 collimates the polarized light which has passed through the analyzer 550, and transmits the resultant light to the second optical transmission medium 570.

Figure 6:
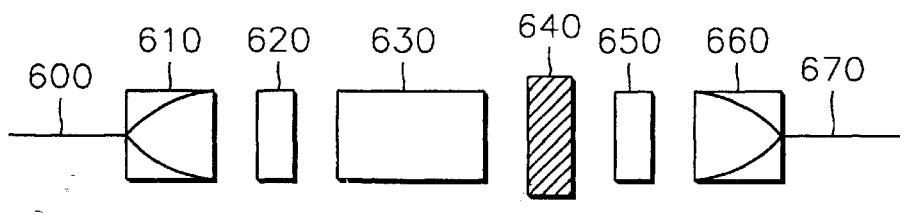
FIG. 6 is a block diagram illustrating the configuration of an optical attenuating isolator which performs both optical attenuation and isolation, according to yet another embodiment of the present invention.

FIG. 6 shows an optical attenuating isolator according to yet another embodiment of the present invention, which includes a first optical transmission medium 600, a first collimator 610, a polarizer 620, a Faraday rotator 630, an optical attenuating filter 640, an analyzer 650, a second collimator 660, and a second optical transmission medium 670.

The embodiment shown in FIG. 6 is the same as that shown in FIG. 5 except that the optical attenuating filter 640 is installed behind the Faraday rotator 630. Likewise, the optical attenuating isolator of FIG. 5 or 6 will be able to be selectively manufactured according to the convenience of a manufacturing process.

In the above-described configurations according to the embodiments, the function of variable optical attenuation can be performed by controlling a linear variable neutral density filter, and simultaneously, the function of isolation can be performed using first and second collimators, a polarizer, a Faraday rotator, and an analyzer. Consequently, optical attenuating isolators according to the present invention are capable of variably determining the degree of optical attenuation.

According to the present invention, an optical attenuator and an isolator are configured into a module, such that insertion loss can be reduced, and that the number of optical transmission media used is reduced, thus preventing generation of loss caused by the optical transmission media. Also, an optical attenuating isolator according to the present invention is used as an optical attenuator for an optical communications system having directivity, such that a deterioration of light of the optical communications system due to back reflection can be prevented, and that the degree of attenuation can be controlled.

What is claimed is:

1. An optical attenuating isolator comprising:
    a first collimator connected to a first optical transmission medium, the first collimator for collimating light received via the first optical transmission medium;
    an optical attenuating filter for attenuating the output light of the first collimator;
    an isolation unit for receiving light attenuated by the optical attenuating filter and passing only polarized light which is polarized in a predetermined specific polarization direction; and
    a second collimator connected to a second optical transmission medium, the second collimator for collimating polarized light which has passed through the isolation unit, and transmitting the resultant light to the second optical transmission medium.

2. The optical attenuating isolator of claim 1, wherein the optical attenuating filter can variably control its attenuation with respect to the received light.

3. The optical attenuating isolator of claim 1, wherein the isolation unit comprises:
    a polarizer for passing only light which is polarized in a direction that is the same as the direction of polarization of the polarizer, among the received light;
    a Faraday rotator for rotating a predetermined number of degrees light which has passed through the polarizer; and
    an analyzer for passing only light which is polarized in a direction that is the same as the direction of the analyzer, among the rotated light.

4. An optical attenuating isolator comprising:
    a first collimator connected to a first optical transmission medium, the first collimator for collimating light received via the first optical transmission medium;
    an isolation unit for receiving the output light of the first collimator and passing only polarized light which is polarized in a predetermined specific polarization direction;
    an optical attenuating filter for attenuating polarized light which has passed through the isolation unit; and
    a second collimator connected to a second optical transmission medium, the second collimator for collimating polarized light which has passed through the optical attenuating filter, and transmitting the resultant light to the second optical transmission medium.

5. The optical attenuating isolator of claim 4, wherein the optical attenuating filter can variably control its attenuation with respect to the received light.

6. The optical attenuating isolator of claim 4, wherein the isolation unit comprises:
    a polarizer for passing only light which is polarized in a direction that is the same as the direction of polarization of the polarizer, among the received light;
    a Faraday rotator for rotating a predetermined number of degrees light which has passed through the polarizer; and
    an analyzer for passing only light which is polarized in a direction that is the same as the direction of the analyzer, among the rotated light.

7. An optical attenuating isolator comprising:
    a polarizer for passing only light which is polarized in a direction that is the same as the direction of polarization of the polarizer, among the received light;
    an optical attenuating filter for attenuating polarized light which has passed through the polarizer;
    a Faraday rotator for rotating attenuated light which has passed through the optical attenuating filter, a predetermined number of degrees; and
    an analyzer for passing only light which is polarized in a direction that is the same as the direction of the analyzer, among the rotated light.

8. The optical attenuating isolator of claim 7, wherein the optical attenuating filter can variably control its attenuation with respect to the received light.

9. The optical attenuating isolator of claim 7, further comprising:
    a first collimator connected to a first optical transmission medium, the first collimator for collimating light received via the first optical transmission medium and transmitting collimated light to the polarizer; and
    a second collimator connected to a second optical transmission medium, the second collimator for collimating light which has passed through the analyzer, and transmitting the resultant light to the second optical transmission medium.

10. An optical attenuating isolator comprising:
    a polarizer for passing only light which is polarized in a direction that is the same as the direction of polarization of the polarizer, among the received light;
    a Faraday rotator for rotating polarized light which has passed through the polarizer, a predetermined number of degrees;
    an optical attenuating filter for attenuating light which has passed through the Faraday rotator; and
    an analyzer for passing only light which is polarized in a direction that is the same as the direction of the analyzer, among the light received from the optical attenuating filter.

11. The optical attenuating isolator of claim 10, wherein the optical attenuating filter can variably control its attenuation with respect to the received light.

12. The optical attenuating isolator of claim 10, further comprising:
   a first collimator connected to a first optical transmission medium, the first collimator for collimating light received via the first optical transmission medium and transmitting collimated light to the polarizer; and
   a second collimator connected to a second optical transmission medium, the second collimator for collimating light which has passed through the analyzer, and transmitting the resultant light to the second optical transmission medium.

13. An optical attenuating isolator, comprising:
   a first optical transmission medium;
   a first collimator connected to the first optical transmission medium, for collimating light from the first optical transmission medium;
   a polarizer for polarizing light passed by the first collimator;
   a variable optical attenuator for variably attenuating the polarized light passed by the polarizer;
   a Faraday rotator for rotating substantially by 45° the polarization of the light passed by the variable optical attenuator;
   an analyzer for passing light from the Faraday rotator having a particular polarization direction;
   a second collimator for receiving light from the analyzer; and
   a second optical transmission medium for transmitting light from the second collimator.

14. The optical attenuating isolator of claim 13, further comprising:
   a screw attached to the exterior of the variable optical attenuator, for adjusting the degree of attenuation.

15. An optical attenuating isolator, comprising:
   a first optical transmission medium;
   a first collimator connected to the first optical transmission medium, for collimating light from the first optical transmission medium;
   a polarizer for polarizing light passed by the first collimator;
   a Faraday rotator for rotating substantially by 45° the polarization of the light passed by the polarizer;
   a variable optical attenuator for variably attenuating the polarized light passed by the Faraday rotator;
   an analyzer for passing light from the variable optical attenuator having a particular polarization direction;
   a second collimator for receiving light from the analyzer; and
   a second optical transmission medium for transmitting light from the second collimator.

16. The optical attenuating isolator of claim 15, further comprising:
   a screw attached to the exterior of the variable optical attenuator, for adjusting the degree of attenuation.

17. The optical attenuating isolator of claim 1, further comprised of said optical attenuating filter and said isolation unit being constructed as a module.

18. The optical attenuating isolator of claim 4, further comprising said optical attenuating filter and said isolation unit being constructed as a module.

19. The optical attenuating isolator of claim 7, further comprising:
   an isolation unit disposed to pass only polarized light flowing in a specific polarization direction; and
   said optical attenuating filter and said isolation unit being constructed as a module.

20. The optical attenuating isolator of claim 10, further comprising;
   an isolation unit passing polarized light exhibiting a polarization direction; and
   said optical attenuating filter and said isolation unit being configured as a module.

* * * * *